(12) United States Patent
Hunter et al.

(10) Patent No.: US 10,500,714 B2
(45) Date of Patent: Dec. 10, 2019

(54) TRUSS-SUPPORTED TOOL TRANSPORT APPARATUS

(71) Applicant: Terrifictools, Inc., Port Richey, FL (US)

(72) Inventors: Robert Hunter, Port Richey, FL (US); John B. Reinhard, New Port Richey, FL (US)

(73) Assignee: Terrifictools, Inc., Port Richey, FL (US)

( * ) Notice: Subject to any disclaimer, the term of this patent is extended or adjusted under 35 U.S.C. 154(b) by 0 days.

(21) Appl. No.: 15/906,468

(22) Filed: Feb. 27, 2018

(65) Prior Publication Data

US 2018/0250807 A1    Sep. 6, 2018

Related U.S. Application Data (60) Provisional application No. 62/465,927, filed on Mar. 2, 2017.

(51) Int. Cl.
| | |
|---|---|
| *B65D 85/28* | (2006.01) |
| *B25H 3/06* | (2006.01) |
| *B25H 3/02* | (2006.01) |
| *B23Q 3/15* | (2006.01) |

(52) U.S. Cl.
CPC ............... *B25H 3/06* (2013.01); *B23Q 3/15* (2013.01); *B25H 3/028* (2013.01); *B65D 2313/04* (2013.01)

(58) Field of Classification Search
CPC . B25H 3/06; B25H 3/028; B25H 3/02; B25H 3/04; B25H 3/00; B65D 21/0222; B65D 21/0223; B65D 21/0219; B65D 2313/04; B65D 21/00; B65D 21/0209; B65D 21/0224; B65D 69/00; B65D 77/00; B65D 85/00; B65D 71/00; B23Q 3/15; B23Q 3/00
USPC ........... 206/372, 373, 1.5; 220/4.26, 4.27, 8; 248/346.01, 346.03, 346.04, 346.4, 346.5
See application file for complete search history.

(56) References Cited

U.S. PATENT DOCUMENTS

| | | | | |
|---|---|---|---|---|
| 4,523,702 | A * | 6/1985 | Viio | A45F 5/00 206/479 |
| 4,653,713 | A * | 3/1987 | Hamilton | B25H 3/02 182/129 |
| 4,805,859 | A * | 2/1989 | Hudson | A01K 97/06 224/406 |
| 5,713,468 | A * | 2/1998 | Streichan | B25H 3/02 190/8 |
| 5,803,586 | A * | 9/1998 | Velez | B25H 3/02 206/372 |
| 5,826,718 | A * | 10/1998 | Ahern, Jr. | B25H 3/02 206/372 |

(Continued)

*Primary Examiner* — Rafael A Ortiz
(74) *Attorney, Agent, or Firm* — Larson & Larson, P.A.; Justin P. Miller; Frank Liebenow (57) ABSTRACT

The truss-supported tool transport apparatus is comprised of a truss-supported tool box and an adapter. The truss-supported tool box has cleat extending from the bottom that are configured to fit over trusses in an attic. The truss-supported tool box includes fasteners on the surface that hold tools securely and compactly which is ideal for working in confined spaces. The truss-supported tool box can be mated with the adapter for working in confined spaces other than attics.

12 Claims, 6 Drawing Sheets

(56) References Cited

U.S. PATENT DOCUMENTS

| | | | |
|---|---|---|---|
| 5,899,420 A * | 5/1999 | Gerardi | B25H 3/021 |
| | | | 220/475 |
| 6,435,389 B1 * | 8/2002 | Sucher | B25H 1/06 |
| | | | 182/129 |
| 7,364,040 B1 | 4/2008 | Hunter et al. | |
| 2003/0000865 A1 * | 1/2003 | Carlino | B65D 69/00 |
| | | | 206/581 |
| 2007/0138752 A1 * | 6/2007 | Kress | B25H 3/06 |
| | | | 280/19 |

* cited by examiner

TRUSS-SUPPORTED TOOL TRANSPORT APPARATUS

CROSS-REFERENCE TO RELATED APPLICATION

This application is a continuation-in-part of U.S. provisional patent application Ser. No 62/465,927, filed Mar. 2, 2017.

FIELD

This invention relates to the field of tool transport and organization; and more particularly to a device for storing and transporting tools for work in confined spaces such as in attics or underneath homes.

BACKGROUND

Workers and craftsmen have a myriad of tools at their disposal to create works of art or construct buildings. Part of their daily trade requires toting heavy and cumbersome tools around with them. This is typically done with a tool box or a tool belt. Both of these methods allow various artisans to transport their tools with them to the job site. But tool boxes and tool belts are often bulky or heavy. This leads to problems when working in confined spaces.

For example, when a job requires crawling into an attic or underneath a house, the tool belt cannot be worn because the tools and snag on nearby surfaces or hazards. Such snags can lead to safety issues.

A tool box often cannot be carried in these spaces either. A tool box full of tools is heavy. And if you are crawling, a user must drag the bulky and heavy toolbox through the confined space. Additionally, tool boxes are hard to drag along uneven surfaces.

What is needed is a truss-supported tool transport apparatus that is tailored for work in confined spaces.

SUMMARY

The truss-supported tool transport apparatus is designed to alleviate problems that occur when working in confined spaces such as attics, crawl spaces, under cars, on bridges, on catwalks, and within maintenance tunnels. The truss-supported tool transport provides a way of securely toting and organizing tools to be used in these spaces.

The truss-supported tool transport apparatus solves several inherent problems with two primary parts, the truss-supported tool box and the adapter.

For work in attics, a worker must transport and balance a tool box, or set of tools, along trusses. A significant space exists between each truss and its adjacent trusses. Due to the spacing of the trusses, a conventional tool box is at risk of falling between the trusses if not placed perfectly. Even then, if the conventional tool box is bumped, it may topple sideways between the trusses to the floor below. Falling tools or tool boxes is a serious risk in the construction industry.

The truss-supported tool box solves this problem with two cleats extending downward from the bottom of the truss-supported tool box. The two cleats are elongated pieces of plastic that protrude downward from the bottom of the truss-supported tool box. When the truss-supported tool box is place across the trusses, each cleat will protrude into the space between trusses. If the truss-supported tool box is knocked or moved sideways, the cleats will catch the trusses and prevent the truss-supported tool box from falling into the space between the trusses.

In addition to the conventional tool box falling, individual tools are at risk of falling off of or out of a conventional tool box. The truss-supported tool box includes a flat top surface with multiple tool fasteners. The fasteners are magnets, straps, and other suitable ways to secure a tool. Metal tools are placed atop the tool box and are held in place by the magnets. Non-metal tools are secured by adjustable straps.

The truss-supported tool box includes a plurality of paired slots. The paired slots each have a restraint that loops through the paired slots forming a loop above the top surface of the truss-supported tool box. The loop in the restraint is then tightened around a tool. The restraining material is hook and loop fasteners, string, tape, or other suitable fastening mechanism.

Storing the tools atop the truss-supported tool box on their side also addresses another problem with using conventional tool boxes in attics or other confined spaces—maneuvering a full size, bulky tool box in the small space is cumbersome.

The truss-supported tool box has a low-profile, shallow design. The compact body of the truss-supported tool box helps a worker avoid snags on wires or ducts when moving the truss-supported tool box.

In order to achieve the compact design and still be easily transported, an integral handle is built into the body. The integral handle is formed by two penetrations running side by side and through the body of the truss-supported tool box. The result is a handle that does not extend upward from the tool box. The user can carry or maneuver the truss-supported tool box by placing his thumb and fingers into the penetrations. This new design prevents interference with existing elements present in a confined space (e.g., electrical lines, data lines, ducts, framing).

Another feature of the truss-supported tool box is the integral storage compartment. In addition to transporting tools, workers often need small pieces such as screws, nuts, bolts, drill bits, or nails to complete their tasks. The storage compartment is formed by a well or cavity in the truss-supported tool box. For added security, and to maintain the overall compact, shallow design, the storage compartment is covered by a lid that is flush with the top of the truss-supported tool box.

The truss-supported tool box has uses beyond carrying tools. Due to the low profile nature and the flat top surface without a flush handle, the truss-supported tool box doubles as a kneeling platform for a worker in an attic. Typically, a worker in an attic must tread carefully atop each truss. This can lead to painful knee placements and contorting the body in uncomfortable ways.

During use, a worker in an attic can remove tools from a truss-supported tool box, place the truss-supported tool box securely across two trusses gaining the added support of the cleats straddling the trusses, and even place a soft pad across the top. The result is a safe and comfortable kneeling platform for use in an attic.

While the truss-supported tool box works well in all confined spaces, sometimes a worker may be in a location that is so confined that dragging the tool box along uneven surfaces is necessary. For example, in a crawl space underneath a building. In these situations, the cleats on the truss-supported tool box will hinder dragging.

The truss-supported tool apparatus includes an adapter for use in work areas where dragging the tool box is necessary. The truss-supported tool transport apparatus is converted to dragging uses by mating the adapter with the truss-supported tool box.

The adapter reduces the resistance of dragging using sloped sides. The slopes allow a technician to more easily drag the truss-supported tool transport apparatus over obstructions.

In contrast to dragging the truss-supported tool box along uneven surfaces, a worker may need to move the truss-supported tool box along smooth surfaces. For example, underneath a vehicle. In these settings, the truss-supported tool box includes removable wheels. The removable wheels make it easier to roll the truss-supported tool box on smooth surfaces while not greatly increasing the profile of the truss-supported tool box.

Sometimes, working in attics and crawl spaces is dark and difficult to see. In these situations, optional lighting elements are useful. Lighting elements include side lights and extendable flashlights.

The cleats, low-profile design, and adapter result in a superior tool box that is far more useful in confined spaces than conventional tool boxes.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Reference will now be made in detail to the presently preferred embodiments of the invention, examples of which are illustrated in the accompanying drawings. Throughout the following detailed description, the same reference numerals refer to the same elements in all figures.

Figure 1:
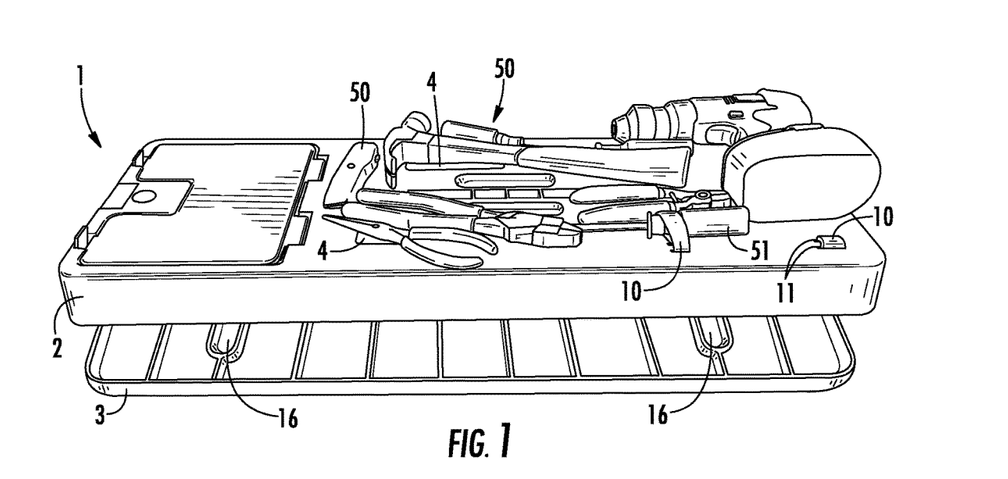
FIG. 1 illustrates a truss-supported tool transport apparatus with the truss-supported tool box being inserted into the adapter.

Referring to FIG. 1, the truss-supported tool transport apparatus 1 is shown. The truss-supported tool transport apparatus 1 is comprised of two primary parts, the truss-supported tool box 2 and the adapter 3.

The truss-supported tool box 2 has magnets 4, straps 10, and paired slots 11 located on the top surface. The magnets 4 secure metal tools to the truss-supported tool box 2. The adjustable straps 10 are looped through the paired slots 11. The straps 10 are tightened around a tool to secure that tool to the truss-supported tool box 2.

For example, the screw driver 51 is secured to the truss-supported tool box 2 with a strap 10. The remaining tools 50 are secured to the truss-supported tool box 2 by the magnets 4.

The adapter 3 has two recesses 16. The recesses 16 are configured to interface with the cleats 12 (FIG. 4) on the bottom of the truss-supported tool box 2.

Figure 2:
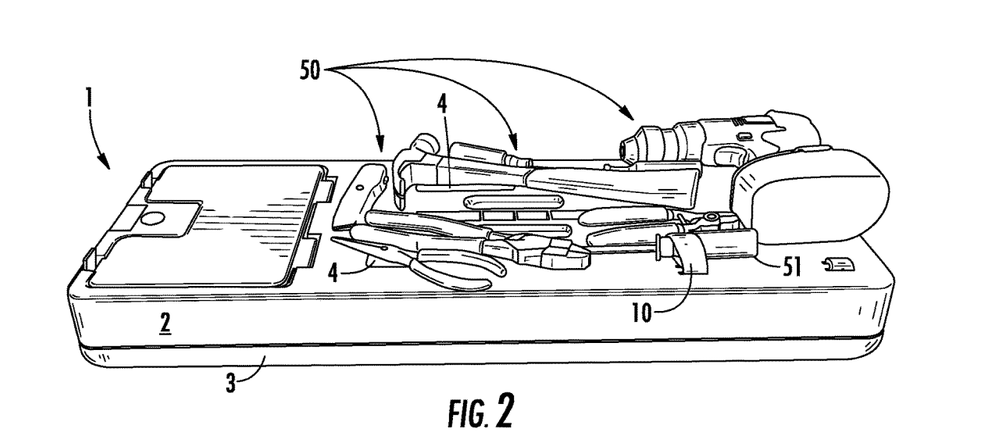
FIG. 2 illustrates a truss-supported tool transport apparatus with the truss-supported tool box mated to the adapter.

Referring to FIG. 2, the tool transport apparatus 1 is shown with the truss-supported tool box 2 mated to the adapter 3.

Figure 3:
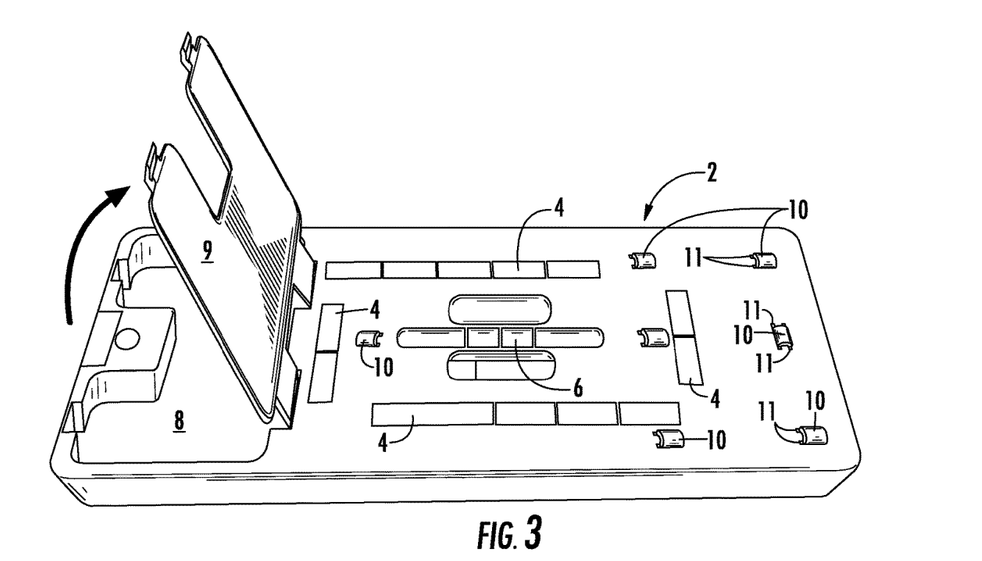
FIG. 3 illustrates a top view of the tool box of the truss-supported tool transport apparatus.

Referring to FIG. 3, a top view of the truss-supported tool box 2 is shown. The truss-supported tool box 2 includes a storage compartment 8, magnets 4, straps 10, and a handle 6.

The storage compartment 8 is formed by a well inside the truss-supported tool box 2 and a lid 9. When closed, the lid 9 is flush with the top surface of the truss-supported tool box 2. The storage compartment 8 holds screws, drill bits, and other small construction pieces.

Figure 4:
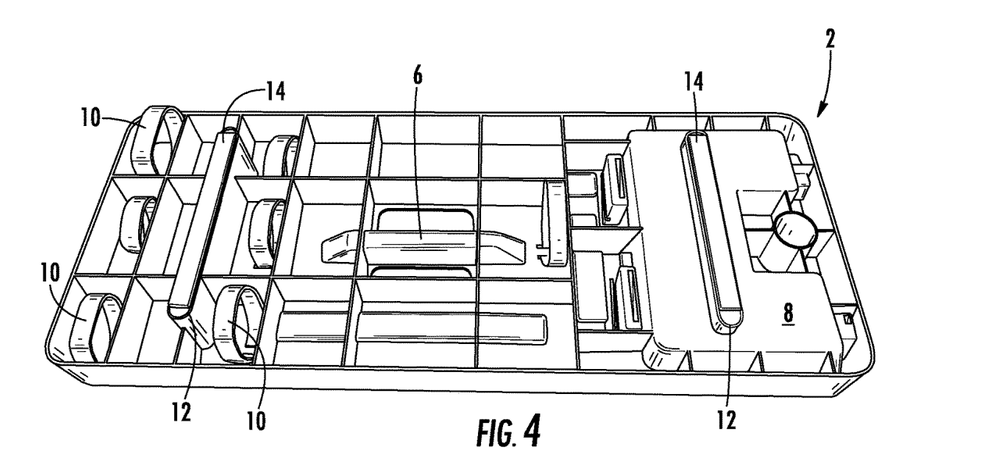
FIG. 4 illustrates a bottom view of the tool box of the truss-supported tool transport apparatus.

Referring to FIG. 4, the bottom of the truss-supported tool box is shown. The cleats 12 are elongated pieces of the truss-supported tool box 2 that extend downward or protrude from the bottom of the truss-supported tool box 2. The cleat 12 may be molded as part of the truss-supported tool box 2 or they may be affixed to the bottom of the truss-supported tool box 2.

The optional cleat magnets 14 are shown on the bottom of the cleats 12. When the truss-supported tool box 2 mates with the adapter 3, the cleat magnets 14 align and connect to recess magnets 15 to securely hold together the truss-supported tool box 2 and the adapter 3 (see FIG. 5).

Figure 5:
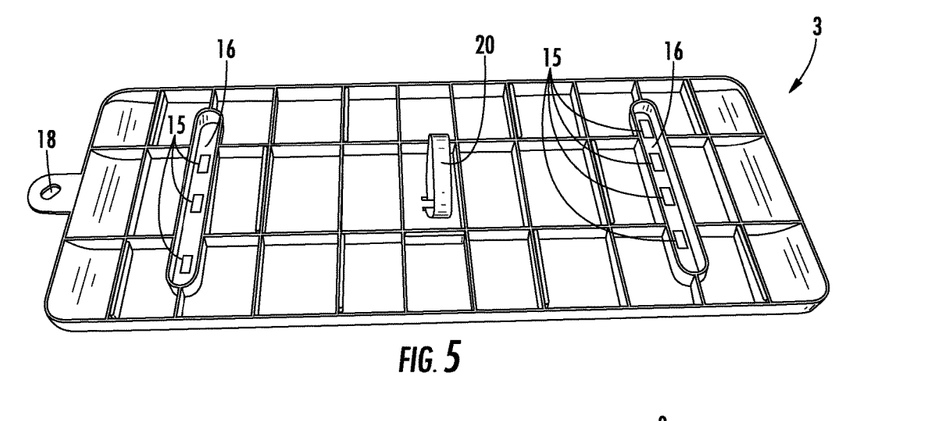
FIG. 5 illustrates a top elevation view of the adapter of the truss-supported tool transport apparatus.

Referring to FIG. 5, a top elevation view of the adapter is shown.

The adaptor has a handle strap 20. The handle strap 20 wraps around the handle 6 of the truss-supported tool box 2 to secure the adaptor 3 to the truss-supported tool box 2.

The adapter 3 includes a rope hole 18. A rope (not shown) can be tied through the rope hole 18 for a user to pull the truss-supported tool transport apparatus 1 along with him.

Figure 6:
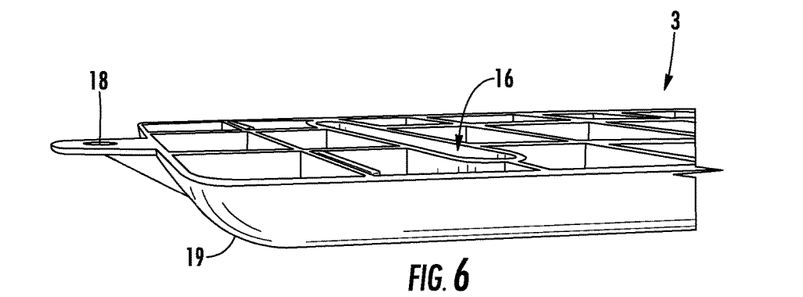
FIG. 6 illustrates a close up view of a swept edge of the adapter.

Referring to FIG. 6, a close-up, side view of the swept edge of the adapter is shown. The swept edges 19 allows easier movement of the truss-supported tool transport apparatus 1 when dragged or pushed over flat, rough, or natural surfaces.

Figure 7:
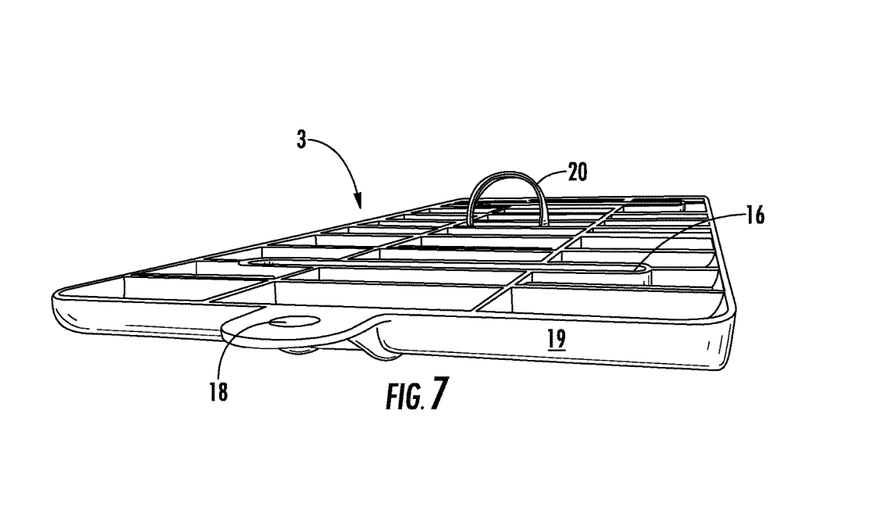
FIG. 7 illustrates a side perspective view of the adapter.

Referring to FIG. 7, a side perspective view of the adapter is shown.

Figure 8:
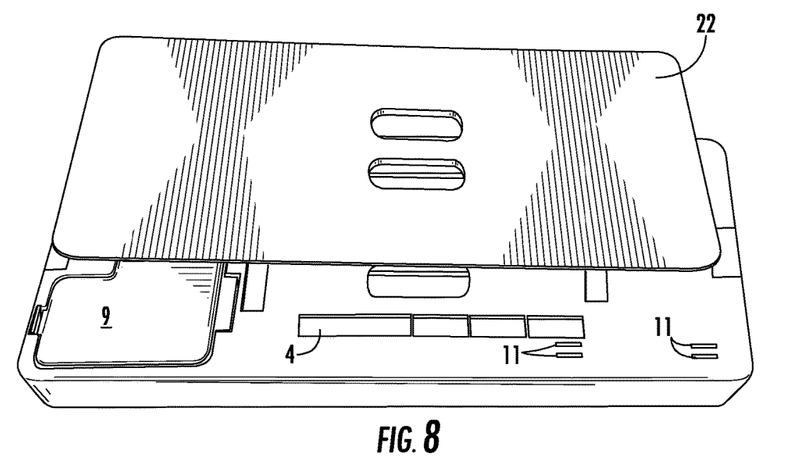
FIG. 8 illustrates a knee pad placed over the truss-supported tool box to create a kneeling platform in an attic.

Referring to FIG. 8, a knee pad 22 for use with the truss-supported tool transport apparatus 1 is shown.

The optional knee pad 22 can be placed on the truss-supported tool box 2 to create a kneeling space when working in an attic. The knee pad 22 is made of foam, fabric, or other soft material.

The knee pad 22 also fits atop the adapter 3 to create a kneeling platform when working other places than an attic.

Figure 9:
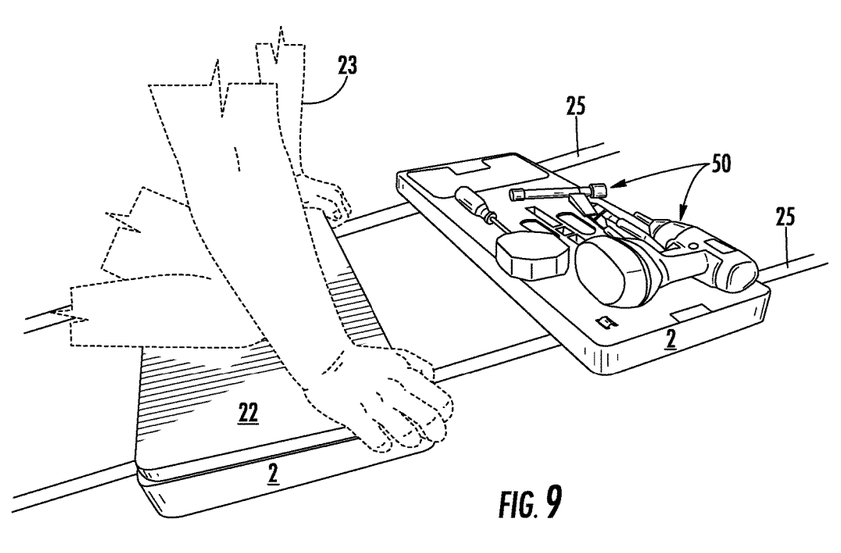
FIG. 9 illustrates a worker in an attic using one truss-supported tool box with a knee pad as a platform while using a second truss-supported tool box for his tools.

Referring to FIG. 9, a worker using one truss-supported tool box 2 to secure tools 50 in front of him in an attic while using another truss-supported tool box 2 with optional knee pad 22 to kneel in the attic during maintenance or construction. The two truss-supported tool boxes 2 are shown on top of trusses 25.

Figure 10:
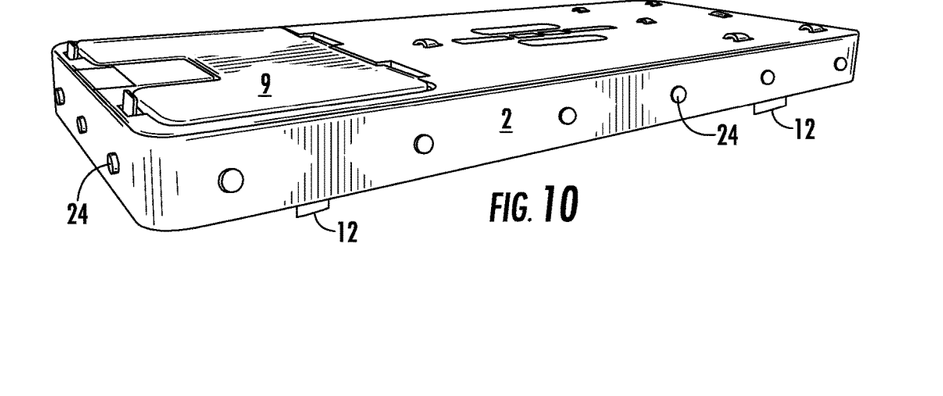
FIG. 10 illustrates the truss-supported tool box with optional side lights.

Referring to FIG. 10, the truss-supported tool box having optional side lights is shown. The side lights 24 are powered by a battery (not shown) located in the storage compartment 8.

Figure 11:
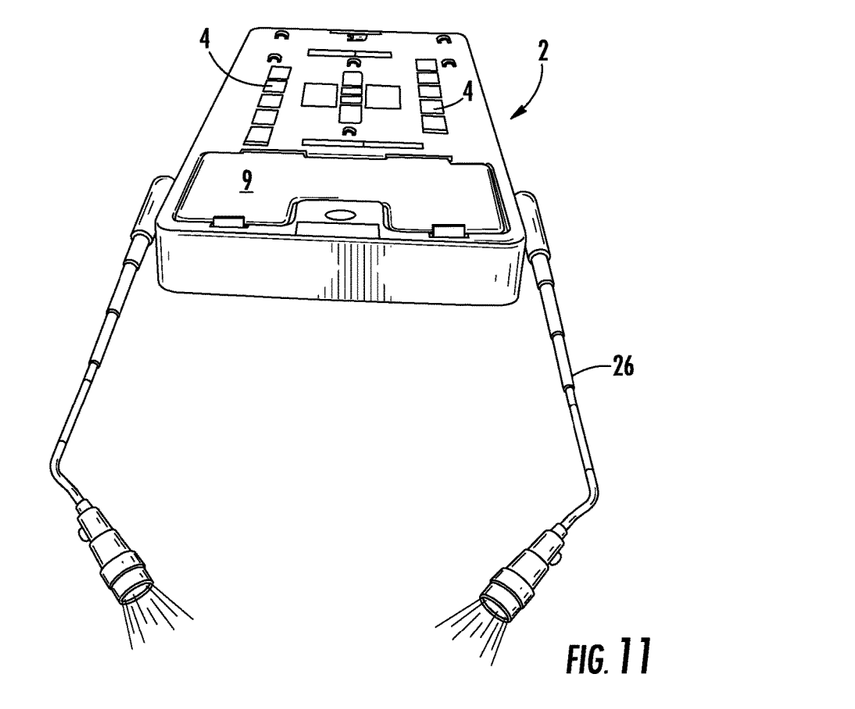
FIG. 11 illustrates the truss-supported tool box with optional flashlights.

Referring to FIG. 11, the truss-supported tool box having extendable, flexible flashlights is shown. The flashlights 26 provide light to a work area to free up the hands of the worker.

Figure 12:
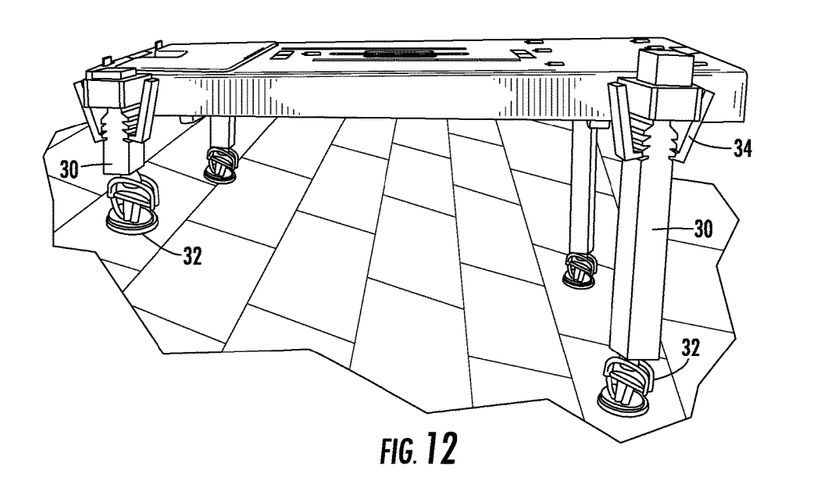
FIG. 12 illustrates the truss-supported tool box with adjustable legs in use on a slanted roof.

Referring to FIG. 12, a side view of the truss-supported tool box is shown having legs. The legs 30 terminate in anti-skid members 32. Depending on the intended use or work area, the anti-skid members 32 may be magnets, suction cups, electromagnets, or high-friction synthetic material.

Figure 13:
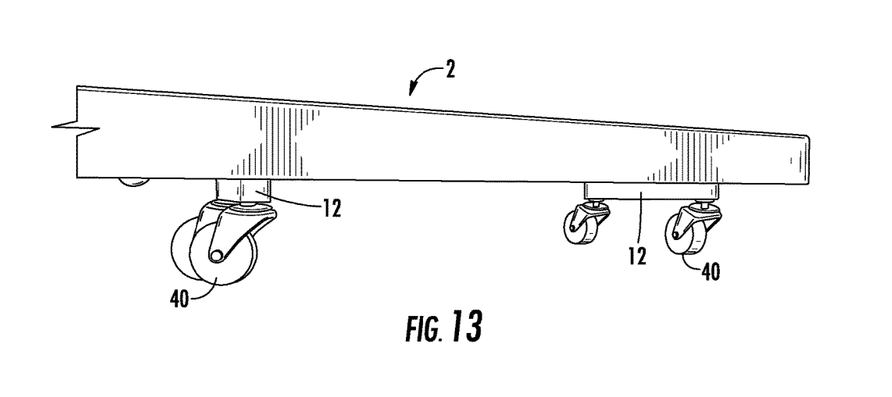
FIG. 13 illustrates the truss-supported tool box with removable wheels.

Referring to FIG. 13, a side view of the truss-supported tool box is shown with removable wheels. The wheels 40 are removably attached to the cleats 12 of the truss-supported tool box 2.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A truss-supported tool transport comprising:
   a tool box;
   two cleats, each cleat extending downward from a bottom of the tool box; and
   an adapter, the adapter comprising:
      an underside with rounded edges, and
      a top with two recesses into which the two cleats of the tool box fit to join the tool box with the adapter;
   whereby the bottom with rounded edges of the adapter reduces the resistance of the tool box when being dragged across a rough surface; and
   whereby when the tool box is used in an attic, each cleat extends down into a space that exists between two trusses.

2. The truss-supported tool transport of claim 1, further comprising:
   a storage compartment, the storage compartment forming a cavity within the tool box; and
   a lid that covers the storage compartment, the lid flush with a top surface of the tool box when closed.

3. The truss-supported tool transport of claim 1, further comprising:
   at least one magnet located on the tool box;
   whereby the at least one magnet secures a metal tool during use.

4. The truss-supported tool transport of claim 1, further comprising:
   at least one adjustable strap located on the tool box;
   whereby the at least one adjustable straps secure tools to the tool box.

5. A tool transport for use atop attic trusses, the tool transport comprising:
   a tool box having a length and a width;
   two cleats, the two cleats:
      formed by downward extensions on a bottom of the tool box, and
      oriented perpendicular to the length of the tool box;
   an adapter having:
      an underside with rounded edges, and
      a top with two penetrations;
   whereby the two penetrations mate with the two cleats thereby joining the tool box with the adapter for use on rough surfaces; and
   whereby when the tool box is placed lengthwise across the attic trusses, the two cleats straddle the attic trusses, thereby preventing lateral movement.

6. The tool transport for use atop attic trusses of claim 5, further comprising:
   a cavity within the tool box; and
   a lid, the lid being flush with a top surface of the tool box when closed.

7. The tool transport for use atop attic trusses of claim 5, further comprising:
   a magnet located on the tool box to hold metal tools in place during use.

8. The tool transport for use atop attic trusses of claim 5, further comprising:
   an adjustable strap located on the tool box to secure tools in place during use.

9. A truss-supported tool transport for use in an attic or a crawl space, the truss-supported tool transport comprising:
   a tool box, the tool box having two or more protrusions extending down from a bottom of the tool box;
   an adapter, the adapter having:
      an underside with rounded edges, and
      a top including two or more penetrations;
   whereby the two or more protrusions are configured to secure the tool box when resting atop trusses in an attic; and
   whereby each of the two or more protrusions mates with one of the two or more penetrations converting the truss-supported tool transport for use in a crawl space.

10. The truss-supported tool transport of claim 9, further comprising a storage compartment, the storage compartment comprising:
    a cavity in the tool box; and
    a lid;
    wherein the lid is flush with a top surface of the tool box when closed.

11. The truss-supported tool transport of claim 9, further comprising:
    a plurality of magnets located on the tool box;
    whereby a metal tool may be secured to one of the plurality of magnets decreasing the risk of the metal tool falling.

12. The truss-supported tool transport of claim 9, further comprising:
    a plurality of tool straps located on the tool box;
    whereby a tool may be secured to the tool box by one of the plurality of straps.

* * * * *